United States Patent
Stolitzka et al.

(10) Patent No.: US 7,095,250 B1
(45) Date of Patent: Aug. 22, 2006

(54) SINGLE WIRE BUS COMMUNICATION SYSTEM WITH METHOD FOR HANDLING SIMULTANEOUS RESPONSES FROM MULTIPLE CLIENTS

(75) Inventors: Dale F. Stolitzka, Los Altos, CA (US); Robert A. Dunstan, Forest Grove, OR (US)

(73) Assignee: Analog Devices, Inc., Norwood, MA (US)

( * ) Notice: Subject to any disclaimer, the term of this patent is extended or adjusted under 35 U.S.C. 154(b) by 120 days.

(21) Appl. No.: 11/020,425

(22) Filed: Dec. 21, 2004

(51) Int. Cl.
   *H03K 19/0175* (2006.01)
(52) U.S. Cl. .............................. 326/82; 326/27; 326/83
(58) Field of Classification Search ................ 710/100, 710/105, 106; 326/26, 27, 82–87
   See application file for complete search history.

(56) References Cited

U.S. PATENT DOCUMENTS

| | | | |
|---|---|---|---|
| 4,766,334 A * | 8/1988 | Warner ........................ | 326/56 |
| 5,818,253 A * | 10/1998 | Takekuma et al. ............ | 326/30 |
| 6,038,623 A | 3/2000 | Schutte ...................... | 710/100 |
| 6,092,138 A | 7/2000 | Schutte ...................... | 710/113 |
| 6,327,688 B1 | 12/2001 | Stolitzka et al. ............ | 714/750 |
| 6,421,752 B1 | 7/2002 | Schutte ...................... | 710/119 |
| 6,430,606 B1 * | 8/2002 | Haq .......................... | 709/208 |
| 6,515,516 B1 * | 2/2003 | Morgan ...................... | 326/86 |
| 6,532,506 B1 | 3/2003 | Dunstan et al. ............. | 710/100 |
| 6,539,443 B1 | 3/2003 | Dunstan et al. ............. | 710/106 |
| 6,873,179 B1 * | 3/2005 | Takekuma et al. ............ | 326/30 |
| 6,956,785 B1 * | 10/2005 | Bell et al. .................. | 365/226 |

* cited by examiner

*Primary Examiner*—Don Le
(74) *Attorney, Agent, or Firm*—Koppel, Patrick & Heybl

(57) ABSTRACT

A single wire bus communication system comprises a bus wire, a host device, and at least one client device, with each host and client device having pull-up and pull-down transistors to pull the bus wire "high" or "low", respectively. The system is arranged such that, in response to a "trigger event" that requires responses from multiple client devices simultaneously, the host device enables its pull-down transistor, and each client device disables its pull-down transistor when conveying a "low" logic level onto the bus. To avoid bus contention, each client's pull-up transistor is arranged to conduct more current when enabled than the host's pull-down transistor. Then, one or more of the client devices' strong pull-ups will overcome the single weak pull-down on the bus, thereby enabling numerous client devices to respond to a command that requires a response from multiple clients.

20 Claims, 3 Drawing Sheets

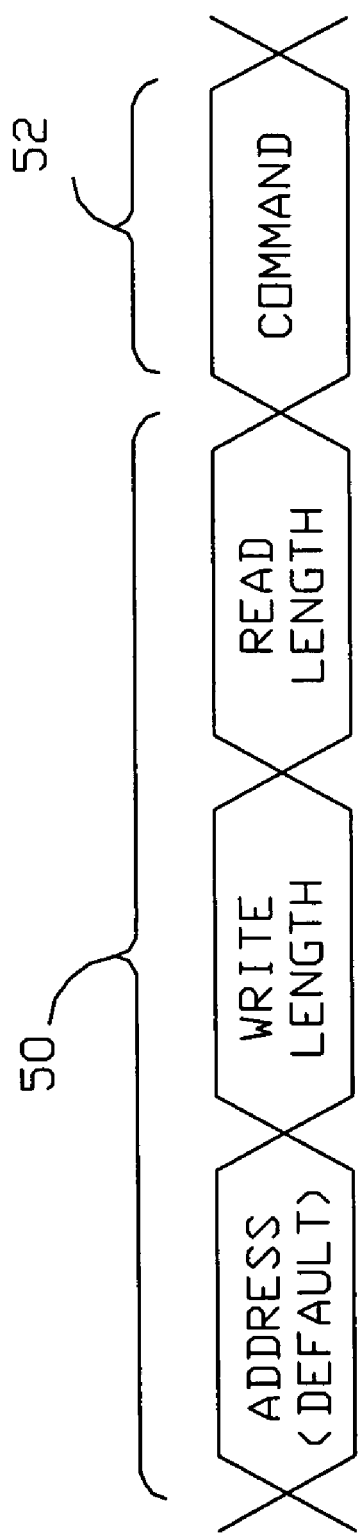
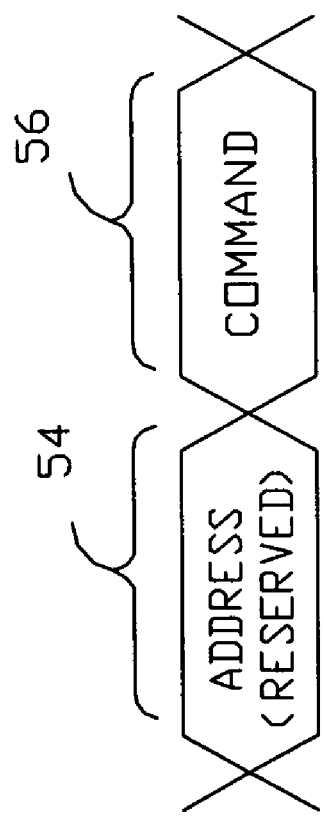
FIG. 3a
FIG. 3b

SINGLE WIRE BUS COMMUNICATION SYSTEM WITH METHOD FOR HANDLING SIMULTANEOUS RESPONSES FROM MULTIPLE CLIENTS

BACKGROUND OF THE INVENTION

1. Field of the Invention

This invention relates to the field of single wire bus communication systems, and particularly to methods of handling simultaneous responses from multiple clients.

2. Description of the Related Art

Single wire bus communication systems which convey digital data between host and client devices connected to the bus wire are well-known. For example, the system described in U.S. Pat. No. 6,532,506 to Dunstan and Stolizka, and the "1-Wire® bus" are single wire systems found in computer and communication systems. Also common are two wire system management busses utilizing two wires where the data signal is synchronized by a clock signal. For example, the SMBus and the I²C bus systems are two-wire busses found in computer systems.

Such busses typically comprise at least one host device and a number of client devices, all connected to a common bus wire. At the system's physical layer, each host and client device has a pull-up device and a pull-down device connected to the bus wire. The host or client establishes a "high" or "low" logic level on the bus by enabling its pull-up or pull-down device, respectively. The pull-up and pull-down devices can be implemented with passive devices such as resistors, or with active devices such as transistors.

In some situations, several client devices may try to convey data onto the bus at the same time. For example, some or all of the client devices might be dynamically addressable, with addresses assigned as the bus system is powered up. To do this, a host device might issue a command that calls for each client device to respond with a unique identification bit sequence. This can result in some devices trying to pull the bus wire up, and other devices trying to pull it down. To ensure that the bus wire is pulled either "high" or "low" (instead of an indeterminate voltage somewhere between the high and low thresholds), the relative strengths of the pull-up and pull-down devices are generally made unequal. In this way, bus contention is resolved in favor of stronger devices which overcome the weak devices so that the bus wire conveys a logic "high" or "low" depending on whether a particular system chooses the pull-up or pull-down to be the stronger device.

However, this approach imposes an upper limit on the ratio of pull-ups to pull-downs, and thus on the number of client devices that may respond to a command that requires a response from multiple clients. For example, assume that the system uses strong pull-up devices and weak pull-down devices. To avoid an indeterminate voltage on the bus and to maintain a required noise margin, the number of pull-down devices must be limited with respect to the number of pull-up devices. Since the bus design choice requires that a strong pull-up device win the contention between strong "high" and weak "low" signals, the number of pull-down devices must be less than that which could create a pull-down stronger than a pull-up.

SUMMARY OF THE INVENTION

A single wire bus communication system is presented which overcomes the problem noted above, enabling a large number of devices to respond to a command that requires a response from multiple clients.

The present system comprises a bus wire, a host device, and at least one client device, with each host and client device having a pull-up and a pull-down device, typically a transistor, which, when enabled, pulls the bus "high" or "low", respectively.

The system is further arranged such that, in response to a "trigger event" that requires responses from multiple client devices simultaneously, the host device enables its pull-down transistor, and each client device disables its pull-down transistor when conveying a "low" logic level onto the bus. To avoid bus contention, the pull-up transistor in each client device is arranged to conduct more current when enabled than the host device's pull-down transistor.

Then, one or more of the client devices' strong pull-ups will overcome the single weak pull-down on the bus. In this way, the number of client devices which can respond to a command that requires a response from multiple clients is greatly increased over that permitted by prior art approaches. Note that the invention also contemplates opposite polarity implementations, in which, in response to a "trigger event", the host device enables its pull-up transistor and each client device disables its pull-up transistor when conveying a "high" logic level onto the bus, with the pull-down transistor in each client device arranged to conduct more current when enabled than the host device's pull-up transistor. The "trigger event" can be any mechanism designed to elicit responses from multiple client devices, such as an address resolution protocol (ARP) or an address discovery process, such as that executed by, for example, the Simple Serial Transport (SST) bus system.

Further features and advantages of the invention will be apparent to those skilled in the art from the following detailed description, taken together with the accompanying drawings.

BRIEF DESCRIPTION OF THE DRAWINGS

FIGS. 3a and 3b illustrate two possible message structures that could be used to trigger the present bus system's multiple-client mode.

DETAILED DESCRIPTION OF THE INVENTION

Figure 1:
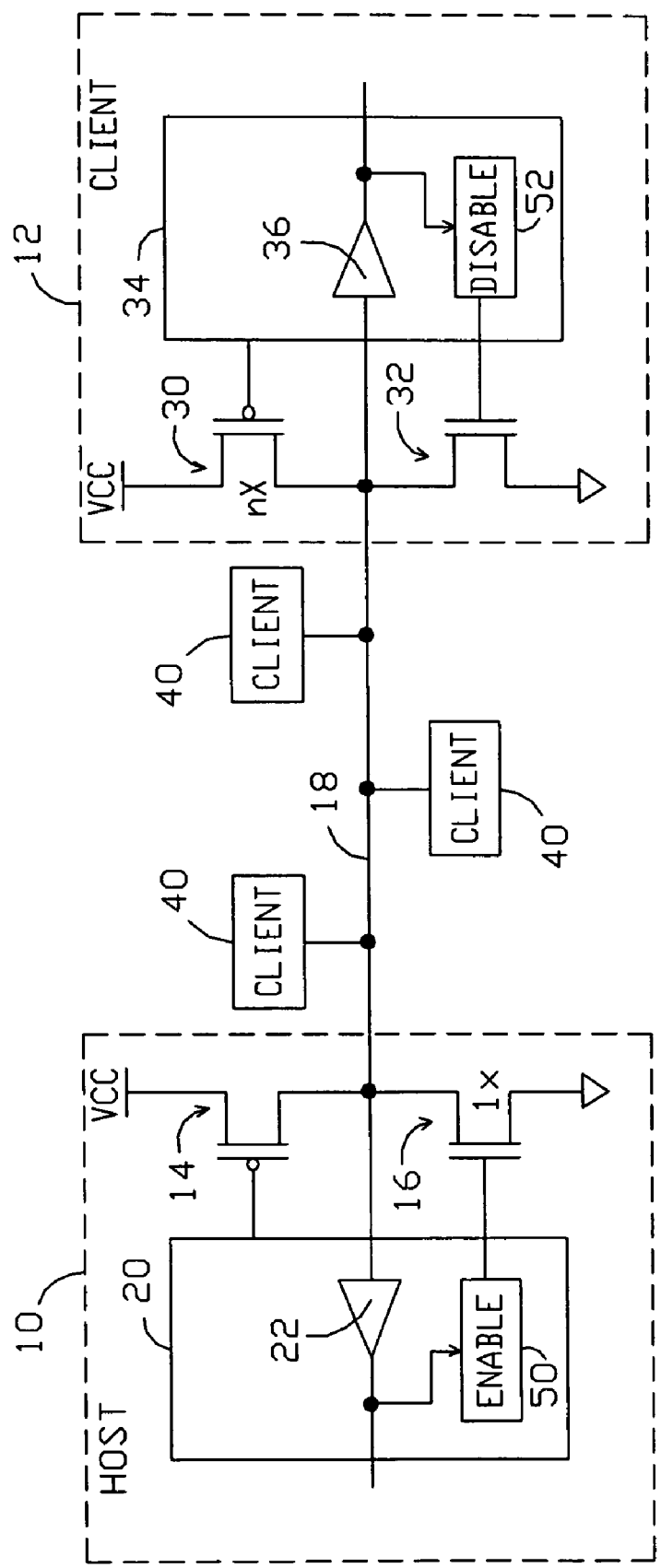
FIG. 1 is a schematic diagram of the physical layer of a single-wire bus communication system per the present invention.

A schematic diagram of the physical layer of a single-wire bus communication system per the present invention is shown in FIG. 1. The system comprises an originating device 10 capable of initiating communications on the bus, typically a "host" device, and at least one client device 12. Host device 10 includes two bus drive devices: a pull-up device 14 and a pull-down device 16, each of which is connected to the system's bus wire 18. Host device 10 also includes control circuitry 20, which comprises a receiver 22 and control logic (not shown) which operates the pull-up and pull-down devices. When pull-up device 14 is "enabled" by control circuitry 20, it is turned on and conducts current to bus wire 18 to pull it up to a logic "high" level. Similarly, when pull-down device 16 is enabled, it conducts current to pull bus wire 18 down to a logic "low" level.

Client device 12 includes similar components: a pull-up device 30 and a pull-down device 32, each of which is connected to the system's bus wire 18. Client device 12 also includes control circuitry 34, which comprises a receiver 36 and control logic which operates the pull-up and pull-down devices. As above, pull-up and pull-down devices 30 and 32 pull bus wire 18 to logic "high" and "low" levels, respectively, when enabled. The system has a "multi-drop" architecture, in which additional client devices 40 can be connected to bus wire 18.

Though pull-up and pull-down devices 14 and 16 are shown as FETs, other types of devices, such as bipolar transistors or current sources, could be used. Pull-down devices 16 might also be implemented with resistors.

The system is arranged such that the pull-down transistor 16 in host device 10 has a strength 1x, and the pull-up transistors in each client device 12, 40 have a strength nX, where n>>1; the ratio of these strengths is typically at least 5:1. Typically, the host device's pull-up transistor 14 would also have a strength nX, and the client device's pull-down transistor 32 would have a strength 1x, so that bus contention is resolved in favor of the stronger pull-up devices. Each client device is arranged to detect bus contention at the bit level while writing on the bus. In accordance with a predefined arbitration process, when a client device detects contention, e.g., the client writes a '0' but detects a '1', it loses contention and must immediately stop writing.

Figure 2:
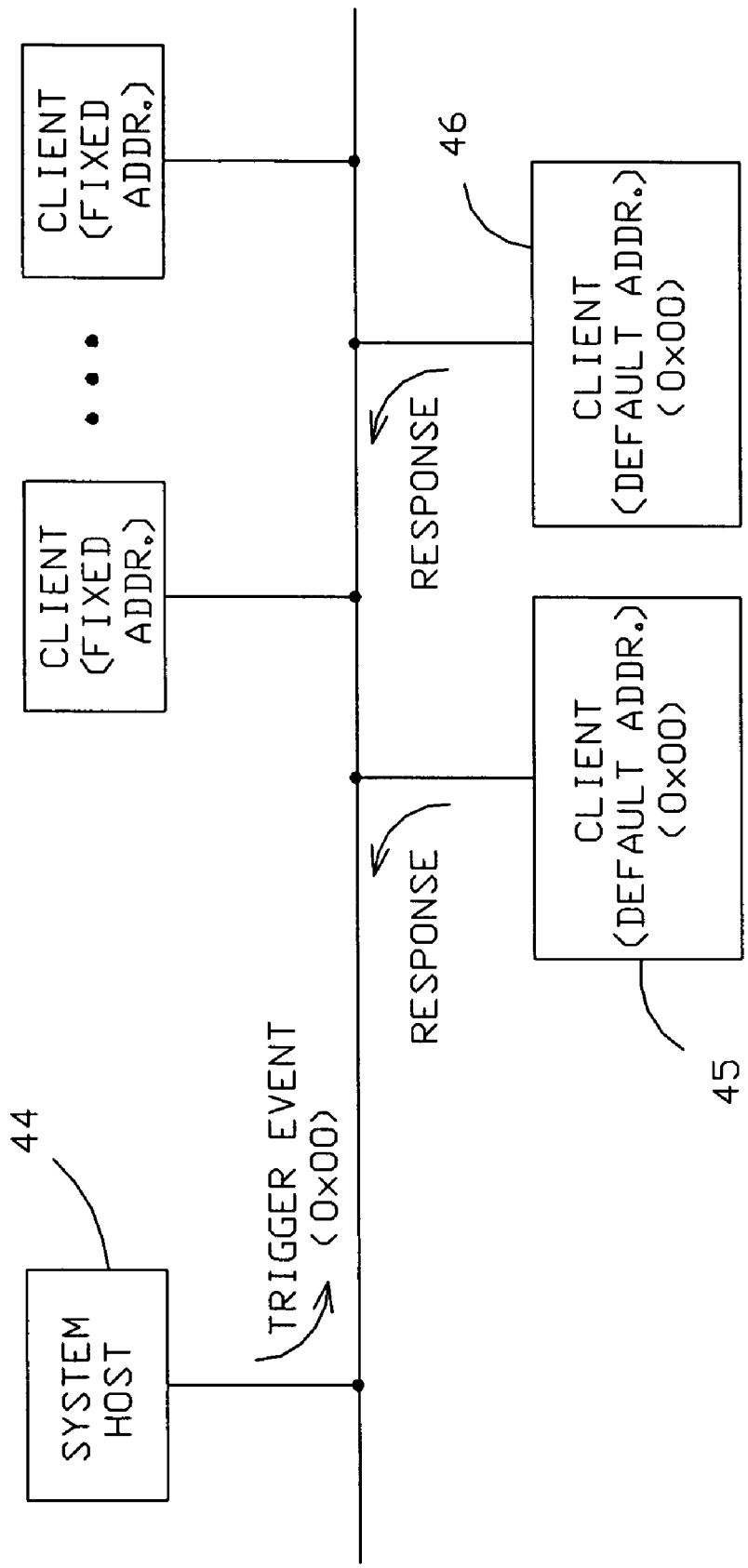
FIG. 2 is a diagram illustrating the general operation of the present bus system in multiple-client mode.

Most communications on the bus occur between host 10 and a single client. In this case, the bus is said to be operating in "single-client" mode. However, in some situations, it may be necessary to request data from multiple client devices, which respond simultaneously. When this type of communication is effected, the bus is said to be operating in "multi-client" mode. Multi-client mode may be invoked as a means to, for example, assign addresses to dynamically addressable client devices, as in an ARP. Here, a dynamically addressable client device is initially addressed by a host device via any predetermined address, such as a "default" address like 0x00 (i.e., 0 in hexadecimal). This causes all the clients at the predetermined address to respond simultaneously. A predefined arbitration scheme enables each client device to provide a unique identification bit sequence to the host, which responds by assigning the client a specific address. This is illustrated in FIG. 2, in which a "trigger event" from a host device 44, in this case a message sent by host 44 to the predefined client "default" address, elicits simultaneous responses from each client device 45, 46 having the default address.

When there are multiple client devices at the predetermined address, each tries to respond simultaneously. If the client devices operate in accordance with prior art methods—i.e., using pull-up and pull-down devices to convey their data onto the bus—the bus may be necessarily subject to a noise margin-related limitation on the number of pull-down devices that can be tolerated for a given number of pull-up devices.

The present invention overcomes this problem. Referring back to FIG. 1: when operating in multi-client mode, the bus system is arranged such that, in response to a trigger event that requires responses from multiple client devices simultaneously, the trigger event's originating device 10 enables its pull-down transistor 16 (via control logic 50 within control circuitry 20), and each of the client devices disables its pull-down transistor 32 when conveying a "low" logic level (via control logic 52 within control circuitry 34) onto the bus. When the pull-down device is a transistor, this results in the client device presenting a high impedance to the bus wire when conveying a logic "low". Thus, when operating in multi-client mode, the client devices' pull-down transistors are not used, and the clients assume that the bus wire will be pulled down by the originating device's pull-down. If a client needs to convey a logic "high", it does so using its pull-up transistor just as in single-client mode. The system is arranged to automatically revert to single-client mode after the requested simultaneous responses have been provided by the multiple client devices while operating in multi-client mode.

By having only one weak pull-down device enabled during multi-client mode, the loading and noise margin issues that limited the number of pull-downs that could be tolerated in multi-client mode are avoided.

The system is arranged such that the above-described multi-client mode is brought about by a trigger event. A trigger event can be any operation that may cause multiple clients to respond simultaneously. The trigger event can be initiated by a host device or any device capable of originating communications on the bus. Typical trigger events would be the execution of an ARP or an address discovery process; note, however, that any global command could be defined as a trigger event.

Note that the "low" and "high" logic levels mentioned above could represent a logic '0' and logic '1', respectively, or a logic '1' and logic '0', respectively, depending upon the requirements of a particular application. Also note that the invention is equally applicable to an opposite polarity implementation, in which, in response to a "trigger event", the host device enables its pull-up transistor and each client device disables its pull-up transistor when conveying a "high" logic level onto the bus, with the pull-down transistor in each client device arranged to conduct more current when enabled than the host device's pull-up transistor.

Typical ways in which a trigger event can be signaled are illustrated in FIGS. 3a and 3b. FIG. 3a shows a message which includes one particular header type. Here, the message header 50 includes a device address byte, a write length byte and a read length byte, with a command byte 52 following header 50. The bus has a predefined "default" address (0x00), which is used to address dynamically addressable client devices until they are assigned fixed addresses. Dynamically addressable client devices having the default address are arranged to respond to a message addressed to the default address by entering multi-client mode and disabling their pull-down transistors as described herein. The "command" byte would then specify the particular task requiring responses from multiple clients, such as an ARP. Thus, in this example, sending a message to default address 0x00 constitutes a trigger event.

Another possibility is illustrated in FIG. 3b, which shows a message structure having a different header type. Here, a message includes an address byte 54 followed by a command byte 56. Some of the possible addresses are designated as "reserved" addresses, and the client devices are pre-arranged to recognize and respond to reserved addresses in a predefined manner. For example, one address might be reserved for initiating an ARP procedure. Then, upon receipt of a message containing the ARP procedure's reserved address, the client devices would automatically enter multi-client mode and respond appropriately. Thus, in this example, sending a message to a particular reserved address constitutes a trigger event.

The present bus system might alternatively be arranged such that it operates in multi-client mode at all times—i.e., the clients' pull-down transistors would have no pull-downs or the pull-downs would always be disabled, and the host device's pull-down would always be enabled. While this approach would work, the always-on host pull-down device would represent a constant load on the bus, with a consequent power consumption that may be unacceptably high. For this reason, it is preferred that a bus system only employ the "client pull-downs disabled/host pull-down enabled" technique described herein when in multi-client mode.

While particular embodiments of the invention have been shown and described, numerous variations and alternate embodiments will occur to those skilled in the art. Accordingly, it is intended that the invention be limited only in terms of the appended claims.

We claim:

1. A single wire bus communication system, comprising:
   a bus wire;
   a message originating device having an output connected to said bus wire, a pull-up device connected to pull said bus wire up to a "high" logic level when enabled, and a pull-down device connected to pull said bus wire down to a "low" logic level when enabled;
   at least one client device, each client device having an output connected to said bus wire, a pull-up device connected to pull said bus wire up to a "high" logic level when enabled, and a pull-down device connected to pull said bus wire down to a "low" logic level when enabled;
   wherein each of said client devices' pull-up devices conducts more current when enabled than said message originating device's pull-down device;
   said system arranged such that, in response to a trigger event that requires responses from multiple client devices simultaneously, said message originating device enables its pull-down device, and each of said client devices disables its pull-down device when conveying a "low" logic level onto the bus wire.

2. The system of claim 1, wherein each of said client devices is arranged to present a high impedance to said bus wire when its pull-down device is disabled.

3. The system of claim 1, wherein said trigger event is provided by said message originating device.

4. The system of claim 3, wherein said message originating device is a host device.

5. The system of claim 1, wherein said trigger event is part of an address resolution protocol (ARP).

6. The system of claim 1, wherein said trigger event is part of an address discovery process.

7. The system of claim 1, wherein said pull-up devices and said pull-down devices are implemented with respective transistors.

8. The system of claim 7, wherein said transistors are field-effect transistors (FETs).

9. The system of claim 1, wherein said pull-up devices and said pull-down devices are implemented with respective current sources.

10. The system of claim 1, wherein said pull-down devices are implemented with resistors.

11. The system of claim 1, wherein said message originating device's pull-down device is arranged to conduct a current x when enabled and said client devices' pull-up devices are each arranged to conduct a current nx when enabled, said system arranged such that n>>1.

12. The system of claim 1, wherein each of said client devices has a "default" address and said trigger event comprises receipt of a message addressed to said default address.

13. The system of claim 1, wherein said client devices are arranged to respond to messages issued to predefined "reserved" addresses, said trigger event comprising receipt of a message addressed to one of said reserved addresses.

14. The system of claim 1, wherein said system has a "single-client" mode in which a message originating device requests a response from one specified client device and a "multi-client" mode in which a message originating device requests simultaneous responses from multiple client devices, said system arranged such that said message originating device enables its pull-down device and each of said client devices disables its pull-down device when conveying a "low" logic level onto the bus wire when operating in said multi-client mode and in said single-client mode.

15. The system of claim 1, wherein said system has a "single-client" mode in which a message originating device requests a response from one specified client device and a "multi-client" mode in which a message originating device requests simultaneous responses from multiple client devices, said system arranged such that said message originating device enables its pull-down device and each of said client devices disables its pull-down device when conveying a "low" logic level onto the bus wire when said system is operating in said "multi-client" mode, and such that each of said client devices enables its pull-down device when conveying a "low" logic level onto the bus wire when said system is operating in said "single-client" mode.

16. The system of claim 15, wherein said system is arranged to automatically revert to said single-client mode after said simultaneous responses have been provided by said multiple client devices while operating in said multi-client mode.

17. The system of claim 1, wherein said system operates in accordance with the Simple Serial Transport (SST) specification.

18. The system of claim 1, wherein said "high" logic level represents a logic '1' and said "low" logic level represents a logic '0'.

19. The system of claim 1, wherein said "high" logic level represents a logic '0' and said "low" logic level represents a logic '1'.

20. A single wire bus communication system, comprising:
   a bus wire;
   a message originating device having an output connected to said bus wire, a pull-up device connected to pull said bus wire up to a "high" logic level when enabled, and a pull-down device connected to pull said bus wire down to a "low" logic level when enabled;
   at least one client device, each client device having an output connected to said bus wire, a pull-up device connected to pull said bus wire up to a "high" logic level when enabled, and a pull-down device connected to pull said bus wire down to a "low" logic level when enabled;
   wherein each of said client devices' pull-down devices conducts more current when enabled than said message originating device's pull-up device;
   said system arranged such that, in response to a trigger event that requires responses from multiple client devices simultaneously, said message originating device enables its pull-up device, and each of said client devices disables its pull-up device when conveying a "high" logic level onto the bus wire.

* * * * *